US008773600B2

(12) United States Patent
Takama

(10) Patent No.: US 8,773,600 B2
(45) Date of Patent: Jul. 8, 2014

(54) LIQUID CRYSTAL LENS AND DISPLAY DEVICE

(75) Inventor: Daisuke Takama, Kanagawa (JP)

(73) Assignee: Japan Display West Inc., Aichi-Ken (JP)

( * ) Notice: Subject to any disclaimer, the term of this patent is extended or adjusted under 35 U.S.C. 154(b) by 764 days.

(21) Appl. No.: 13/023,099

(22) Filed: Feb. 8, 2011

(65) Prior Publication Data

US 2011/0199548 A1    Aug. 18, 2011

(30) Foreign Application Priority Data

Feb. 15, 2010  (JP) .............. P2010-030219

(51) Int. Cl.
    *G02F 1/1335*    (2006.01)
(52) U.S. Cl.
    USPC .............................. 349/15; 349/33; 349/200
(58) Field of Classification Search
    CPC ....................................................... G02F 1/01
    USPC ............................................. 349/15, 33, 200
    See application file for complete search history.

(56) References Cited

U.S. PATENT DOCUMENTS

| | | | | |
|---|---|---|---|---|
| 7,710,535 | B2 * | 5/2010 | Nomura et al. | 349/200 |
| 7,738,344 | B2 * | 6/2010 | Ooi et al. | 369/112.02 |
| 7,872,694 | B2 | 1/2011 | Im | |
| 8,089,676 | B2 | 1/2012 | Dursteler Lopez et al. | |
| 2009/0097381 | A1 * | 4/2009 | Hamano et al. | 369/112.04 |

FOREIGN PATENT DOCUMENTS

| | | |
|---|---|---|
| JP | 60-050510 | 3/1985 |
| JP | 63-249125 | 10/1988 |
| JP | 05-100201 | 4/1993 |
| JP | 2000-089168 | 3/2000 |
| JP | 2009-104137 | 5/2009 |
| JP | 2009-540380 | 11/2009 |

OTHER PUBLICATIONS

"Switchable Electro-Optic Diffractive Lens with High Efficiency for Ophthalmic Applications", 6100-6104, PNAS, Apr. 18, 2006, vol. 103, No. 16.
Japanese Office Action issued Sep. 24, 2013 for Japanese Appln. No. 2010-030219.

* cited by examiner

*Primary Examiner* — Eric Wong
(74) *Attorney, Agent, or Firm* — K&L Gates LLP

(57) ABSTRACT

A liquid crystal lens is provided and includes a first electrode, a second electrode disposed opposite to the first electrode, and a liquid crystal layer, including liquid crystal molecules having refractive anisotropy, disposed between the first electrode and the second electrode, the liquid crystal molecules being changed in alignment depending on voltage applied by the first electrode and the second electrode, thereby to form such a phase difference distribution that phase difference with respect to an incident beam of a fundamental wavelength varies from 0 to $2\pi\beta$ along the predetermined direction, $\beta$ being an integer of 2 or more, and to yield such a lens effect that focal lengths for a plurality of incident beams of different wavelengths including the fundamental wavelength are equal to one another.

10 Claims, 15 Drawing Sheets

LIQUID CRYSTAL LENS AND DISPLAY DEVICE

CROSS REFERENCES TO RELATED APPLICATIONS

The present application claims priority to Japanese Patent Application No. JP 2010-030219 filed on Feb. 15, 2010, the entire contents of which are being incorporated herein by reference.

BACKGROUND

The present disclosure relates to a liquid crystal lens using liquid crystal molecules having refractive anisotropy to generate a lens effect, and a display device using the liquid crystal lens.

In the past, a binocular or multi-view stereoscopic display device, which achieves stereoscopy through presenting a parallax image to both eyes of a viewer, has been known. As a method for achieving such a stereoscopic display device, for example, a two-dimensional display device such as liquid crystal display is combined with an optical device (parallax separation unit) for three-dimensional display for deflecting display image light from the two-dimensional display device in a plurality of view angle directions. As the optical device for three-dimensional display, a cylindrical lens array (lenticular lens) 302, including a plurality of cylindrical lenses 303 arranged in parallel, is used, for example, as shown in FIG. 18. The lenticular lens 302 is disposed opposite a display surface of a display panel 301 including the two-dimensional display device. Each cylindrical lens 303 is arranged to extend in a longitudinal direction to the display surface of the display panel 301 so as to have refracting power in a lateral direction. A plurality of display pixels are regularly arranged in a two-dimensional manner on the display surface of the display panel 301. Two or more pixels are disposed behind one cylindrical lens 303, and beams emitted from the pixels are directed in different horizontal directions by refracting power of the lens to meet binocular parallax, thereby enabling naked-eye stereoscopy.

FIG. 18 shows an example of binocular stereoscopic display, where adjacent two pixel arrays 301R and 301L on the display surface of the display panel 301 are allocated to each cylindrical lens 303. One pixel array 301R displays a right-parallax image, and the other pixel array 301L displays a left-parallax image. Each of the displayed parallax images is directed to a laterally separated light path 402 or 403 by each cylindrical lens 303. Consequently, when a viewer 400 views such a stereoscopic display device in a predetermined direction and from a predetermined position, the right and left parallax images appropriately reach right and left eyes of the viewer 400, respectively, and the viewer thus senses a stereoscopic image.

Similarly, for multi-view stereoscopic display, a plurality of parallax images, which are taken at positions and in directions corresponding to three or more visual points, are evenly allocated and displayed within a lateral lens pitch of the cylindrical lens 303. Consequently, three or more parallax images are emitted in continuous, different angle ranges and focused by the lenticular lens 302. In this case, a plurality of different parallax images are sensed in correspondence to positions and directions of changed visual lines of the viewer 400. A more realistic stereoscopic effect may be obtained with increase in number of the parallax images in correspondence to changed visual points.

As the lenticular lens 302, for example, a resin-molded lens array, which is fixed in shape and thus fixed in lens effect, may be used. In this case, since the lens effect is fixed, a special display device for three-dimensional display is given. A switchable lens array element with a liquid crystal lens may be also used as the lenticular lens 302. In the case of the switchable lens array element with a liquid crystal lens, since presence or absence of a lens effect may be electrically switched, a display mode may be switched between two display modes, namely, two-dimensional display mode and three-dimensional display mode, through combining the lens array element with a two-dimensional display device. In other words, in the two-dimensional display mode, the lens array is set to be in a no-lens-effect state (no-refracting-power state) so as to transmit display image light from the two-dimensional display device without any change. In the three-dimensional display mode, the lens array is set to be in a lens-effect state so as to deflect the display image light from the two-dimensional display device in a plurality of view angle directions, so that stereoscopy is achieved.

A configuration example of the switchable (variable) lens array element with a liquid crystal lens is described with reference to FIGS. 19A and 19B. The figures mainly show a structure of an electrode portion while omitting other components such as a substrate and an alignment film. Moreover, the figures show the configuration in a simplified manner for illustrating a principle of generation of a lens effect in the lens array element. The variable lens array element includes transparent first and second substrates made of, for example, a glass material, and a liquid crystal layer 130 sandwiched between the first and second substrates. The first and second substrates are oppositely disposed with a space d.

A first electrode 111 including a transparent conductive film such as an ITO (Indium Tin Oxide) film is uniformly formed over almost the whole surface on the first substrate. In addition, a first alignment film is formed on the first substrate in a manner to contact with the liquid crystal layer 130 via the first electrode 111. Second electrodes 121Y including a transparent conductive film such as an ITO film are partially formed on the second substrate. In addition, a second alignment film is formed on the second substrate in a manner to contact with the liquid crystal layer 130 via the second electrodes 121Y.

The liquid crystal layer 130 includes liquid crystal molecules 131, where an alignment direction of the liquid crystal molecules 131 is changed depending on voltage applied by the first electrode 111 and the second electrodes 121Y, so that the lens effect is controlled. Each liquid crystal molecule 131 has refractive anisotropy, and thus, for example, has a structure of an optical indicatrix having different refractive indexes to a passing beam between a long-side direction and a short-side direction. The liquid crystal layer 130 is electrically switched between a no-lens-effect state and a lens-effect state depending on voltage applied by the first electrode 111 and the second electrodes 121Y.

In the lens array element, as shown in FIG. 19A, the liquid crystal molecules 131 are uniformly aligned in a predetermined direction defined by the first and second alignment films in a normal condition with applied voltage of 0 V. Therefore, a wave front 201 of a passing beam is a plane wave, showing the no-lens-effect state. In the lens array element, since the plurality of second electrodes 121Y are separately arranged from one another with a predetermined space, when a predetermined drive voltage is applied between the first electrode 111 and the second electrodes 121Y, deviation occurs in electric field distribution within the liquid crystal layer 130. In other words, an electric field is generated such that field strength is increased in accordance with the applied drive voltage in a portion corresponding to a region where each second electrode 121Y is formed, and decreased in a portion nearer to the center of an opening between the plurality of second electrodes 121Y. Therefore, alignment of the liquid crystal molecules 131 is changed in accordance with field strength distribution as shown in FIG. 19B. Consequently, the wave front 202 of a passing beam is changed, leading to a lens-effect generation state.

Such a variable lens array element may be used to equivalently generate a lens effect of a lenticular lens. Consequently, switchable display may be made between two-dimensional display mode and three-dimensional display mode.

Recently, a liquid crystal lens, which uses such an optical characteristic of a liquid crystal changed depending on applied voltage, has been increasingly developed. Use of a liquid crystal eliminates need of mechanically movable portions, which contributes to reduction in size and weight of a lens unit. "Switchable electro-optic diffractive lens with high efficiency for ophthalmic applications", PNAS, 103, 16, 2006, pp. 6100-6104 proposes a method to generate a Fresnel-lens-like lens effect by a liquid crystal lens in order to widen an aperture of a lens and to improve performance of the lens. In the above non-patent document, an electrode is patterned in a concentric configuration to generate the Fresnel-lens-like lens effect. Japanese Unexamined Patent Application Publication No. 63-249125 and Japanese Unexamined Patent Application Publication No. 5-100201 also describe methods to generate a Fresnel-lens-like lens effect by using a liquid crystal. A liquid crystal lens is formed like a Fresnel lens as in the non-patent document, and therefore an aperture may be widened and besides the amount of liquid crystal material to be used may be decreased, leading to reduction in cost. Furthermore, the non-patent document describes an example of achieving glasses using the liquid crystal lens.

SUMMARY

However, when a liquid crystal lens is used, for example, for a stereoscopic display device, wavelength dispersion of the liquid crystal lens is an issue. Since the liquid crystal lens uses a diffraction phenomenon, a focal length is greatly different between respective wavelengths of broadband light such as white light, leading to color aberration. Therefore, good stereoscopic image quality may not be obtained in color display.

Generally, a diffraction lens is designed to form phase difference distribution of 0 to $2\pi$ with respect to a passing beam. For example, a Fresnel-lens, having a concentric Fresnel pattern, is designed to form phase difference distribution with phase difference being periodically changed from 0 to $2\pi$ in a lens radius direction. The same design is made in the case that a liquid crystal lens is used to generate the Fresnel-lens-like lens effect. In the liquid crystal lens, a liquid crystal layer needs to be increased in thickness in order to obtain large phase difference distribution more than $2\pi$. Therefore, such large phase difference distribution has not been considered in design of the liquid crystal lens in the past.

It is desirable to provide a liquid crystal lens that may reduce color aberration, and a display device that may perform good image display with color aberration being reduced.

A liquid crystal lens according to an embodiment includes a first electrode, a second electrode disposed opposite to the first electrode, and a liquid crystal layer, including liquid crystal molecules having refractive anisotropy, disposed between the first electrode and the second electrode, the liquid crystal molecules being changed in alignment depending on voltage applied by the first electrode and the second electrode, thereby to form such a phase difference distribution that phase difference with respect to an incident beam of a fundamental wavelength varies from 0 to $2\pi\beta$ along the predetermined direction, $\beta$ being an integer of 2 or more, and to yield such a lens effect that focal lengths for a plurality of incident beams of different wavelengths including the fundamental wavelength are equal to one another.

A display device according to an embodiment includes a display unit performing two-dimensional image display, and a liquid crystal lens disposed opposite to the display unit so that display image light from the display unit enters the liquid crystal lens. The liquid crystal lens is configured of the liquid crystal lens according to the embodiment.

In the liquid crystal lens according to the embodiment, the phase difference distribution that phase difference with respect to an incident beam of a fundamental wavelength varies from 0 to $2\pi\beta$ along the predetermined direction is formed, $\beta$ being an integer of 2 or more, and the lens effect is generated so that focal lengths for a plurality of incident beams of different wavelengths including the fundamental wavelength are equal to one another. Consequently, color aberration is reduced compared with a previous liquid crystal lens providing phase difference distribution of 0 to $2\pi$.

In the display device according to the embodiment, for example, display image light from the display unit is refracted by the liquid crystal lens so as to enable stereoscopy, and therefore three-dimensional display is performed. In such three-dimensional display, the liquid crystal lens according to the embodiment, being reduced in color aberration, is used, leading to good image display with color aberration being reduced.

According to the liquid crystal lens of the embodiment, phase difference distribution is formed with phase difference being changed from 0 to $2\pi\beta$, a lens effect is generated so that focal lengths for a plurality of incident beams of different wavelengths including the fundamental wavelength are equal to one another, and therefore color aberration may be reduced compared with a previous liquid crystal lens providing phase difference distribution of 0 to $2\pi$.

According to the display device of the embodiment, the liquid crystal lens according to the embodiment, being reduced in color aberration, is used, and therefore good image display with color aberration being reduced may be performed.

Other features of the embodiments will appear more fully from the following description.

Additional features and advantages are described herein, and will be apparent from the following Detailed Description and the figures.

BRIEF DESCRIPTION OF THE FIGURES

FIG. 19A shows a non-lens-effect state, and FIG. 19B shows a lens-effect state.

DETAILED DESCRIPTION

Hereinafter, an embodiment will be described in detail with reference to drawings.

Configuration of Liquid Crystal Lens 1

Figure 1:
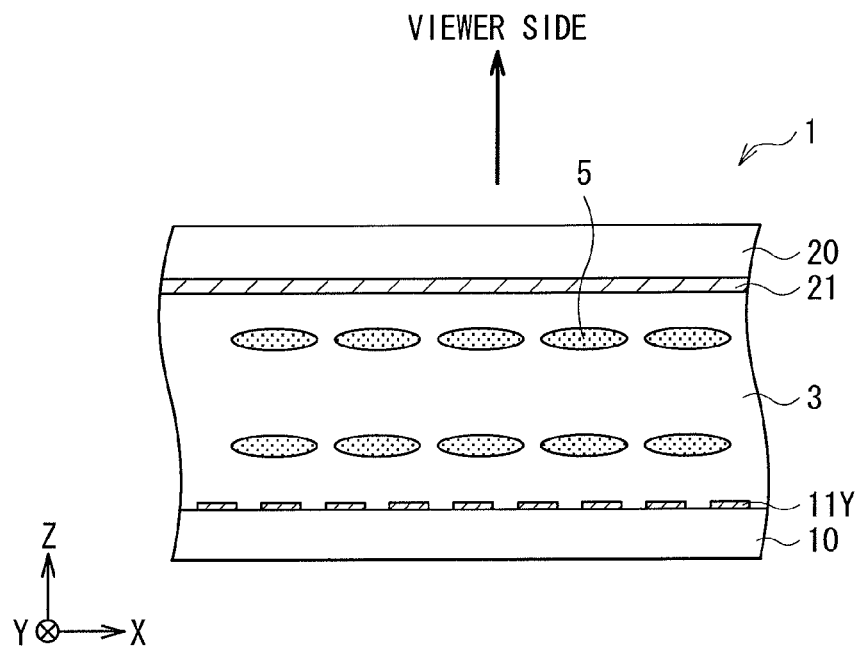
FIG. 1 is a section diagram showing a configuration example of a liquid crystal lens according to an embodiment.

FIG. 1 shows a configuration example of a liquid crystal lens 1 according to an embodiment. The liquid crystal lens 1 has a first substrate 10, a second substrate 20 disposed opposite to the first substrate with a space, and a liquid crystal layer 3 disposed between the first substrate 10 and the second substrate 20. The first substrate 10 and the second substrate 20 are transparent substrates made of, for example, a glass or resin material.

First electrodes 11Y including a transparent conductive film such as an ITO film are partially formed on the first substrate 10 on a side of the first substrate facing the second substrate 20. In addition, a first alignment film, which is not shown, is formed on the first substrate 10 in a manner to contact with the liquid crystal layer 3 via the first electrodes 11Y. A second electrode 21 including a transparent conductive film such as an ITO film is formed on the second substrate 20 over almost the whole area of the second substrate on a side facing the first substrate 10. In addition, a second alignment film 23 is formed on the second substrate 20 in a manner to contact with the liquid crystal layer 3 via the second electrode 21.

The liquid crystal layer 3 includes liquid crystal molecules 5. An alignment direction of the liquid crystal molecules 5 is changed depending on voltage applied by the first electrodes 11Y and the second electrode 21, and therefore a lens effect is controlled. Each liquid crystal molecule 5 has dielectric anisotropy and refractive anisotropy, and has a structure of an optical indicatrix having different refractive indexes to a passing beam between a long-side direction and a short-side direction. The liquid crystal layer 3 is electrically switched between a no-lens-effect state and a lens-effect state depending on voltage applied by the first electrodes 11Y and the second electrode 21. The not-shown first alignment film and the not-shown second alignment film 23 are applied with predetermined rubbing. When voltage is not applied to the liquid crystal molecules 5, the molecules 5 are substantially uniformly aligned in a direction parallel to a predetermined alignment direction defined by the rubbing.

Figure 3:
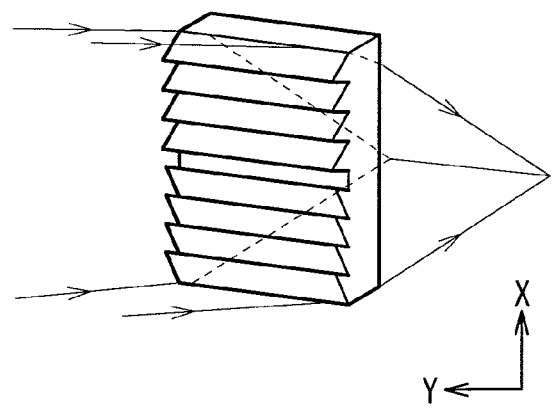
FIG. 3 is an explanatory diagram schematically showing an optically equivalent lens as an example of a lens effect obtained by the liquid crystal lens shown in FIG. 1.

The embodiment is described with a structure example in the case that the liquid crystal lens 1 generates a linear Fresnel-lens-like lens effect having refracting power in only one direction (X direction) as shown in FIG. 3.

Figure 2:
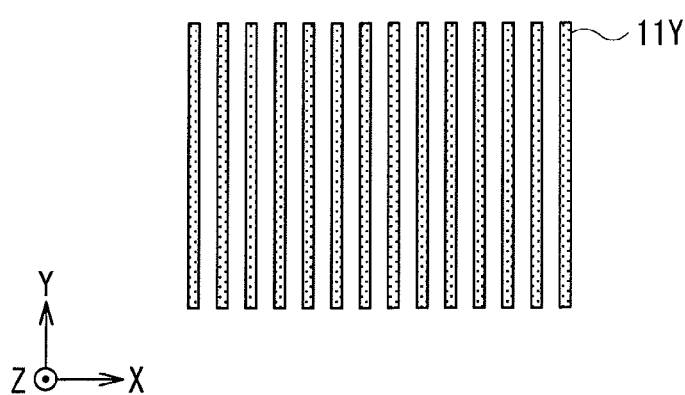
FIG. 2 is a plan diagram showing a configuration example of first electrodes of the liquid crystal lens shown in FIG. 1.

The first electrodes 11Y include a plurality of line electrodes arranged with spaces from one another as shown in FIG. 2 in order to generate the linear Fresnel-lens-like lens effect as shown in FIG. 3. The first electrodes 11Y extend in a longitudinal direction (Y direction) with a predetermined electrode width and are arranged in parallel in the X direction with predetermined spaces so that continuous phase difference distribution may be formed in one direction (X direction) with respect to an incident beam. A specific example of phase difference distribution and a specific example of voltage applied to form the phase difference distribution are described later.

Configuration of Display Device

Figure 4:
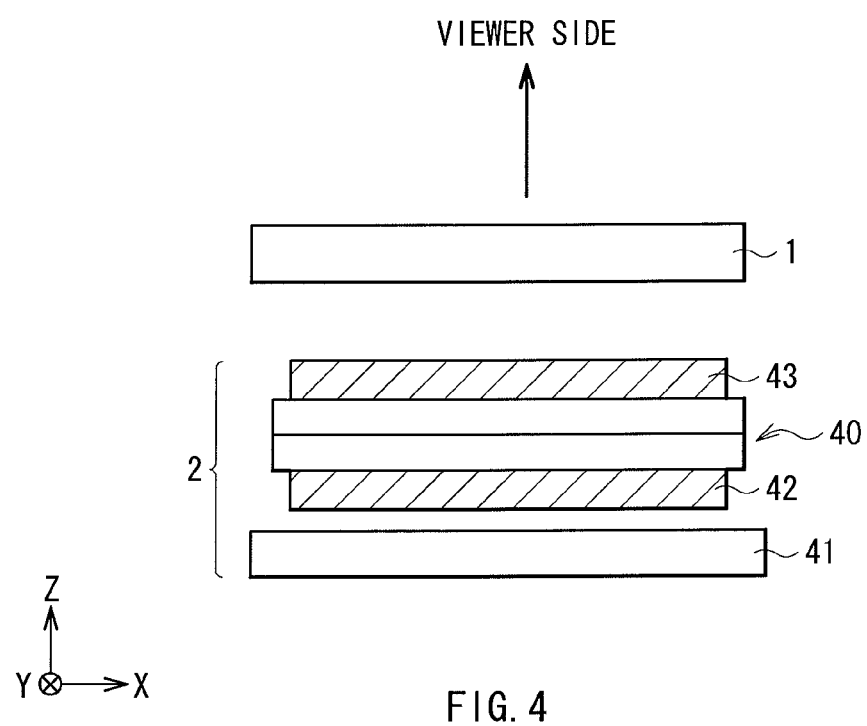
FIG. 4 is a section diagram showing an example of a display device using the liquid crystal lens shown in FIG. 1.

FIG. 4 shows an example of a display device using the liquid crystal lens 1. The display device has a liquid crystal display module 2 as a display unit for two-dimensional image display, and has the liquid crystal lens 1 disposed opposite to a display surface of the liquid crystal display module 2.

Figure 5:
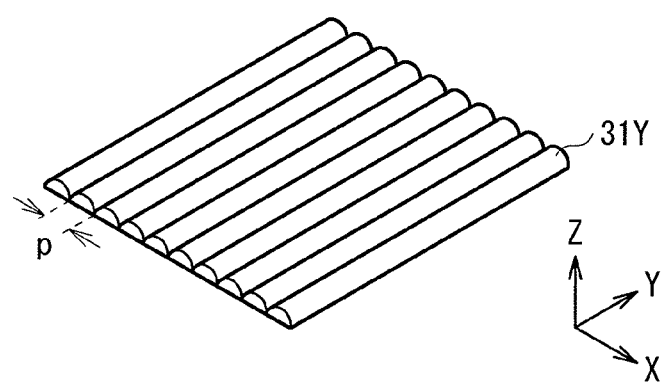
FIG. 5 is a perspective diagram showing an example of a lenticular lens used for a lenticular-type stereoscopic display device.
Figure 18:
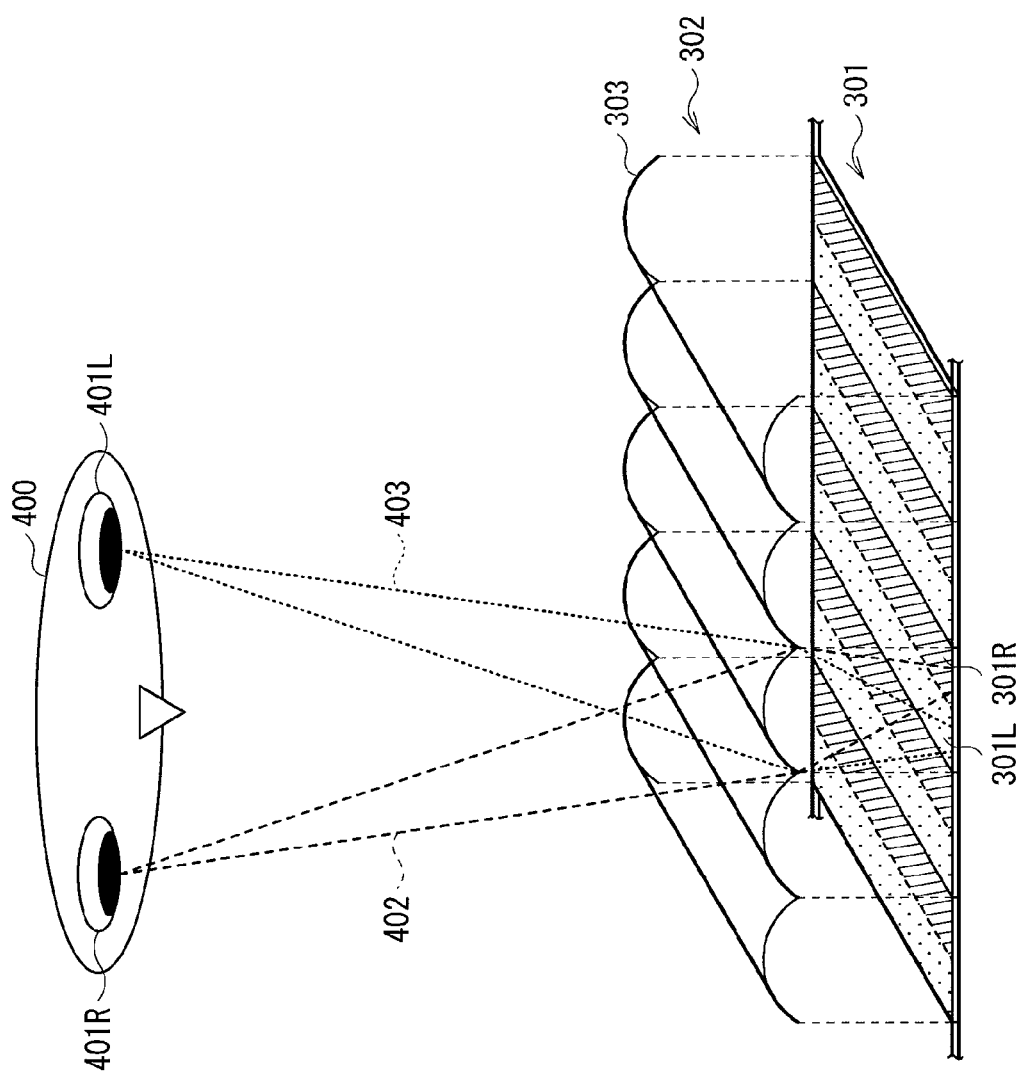
FIG. 18 is an explanatory diagram showing a concept of stereoscopic display using cylindrical lenses in the past.
Figure 19A:
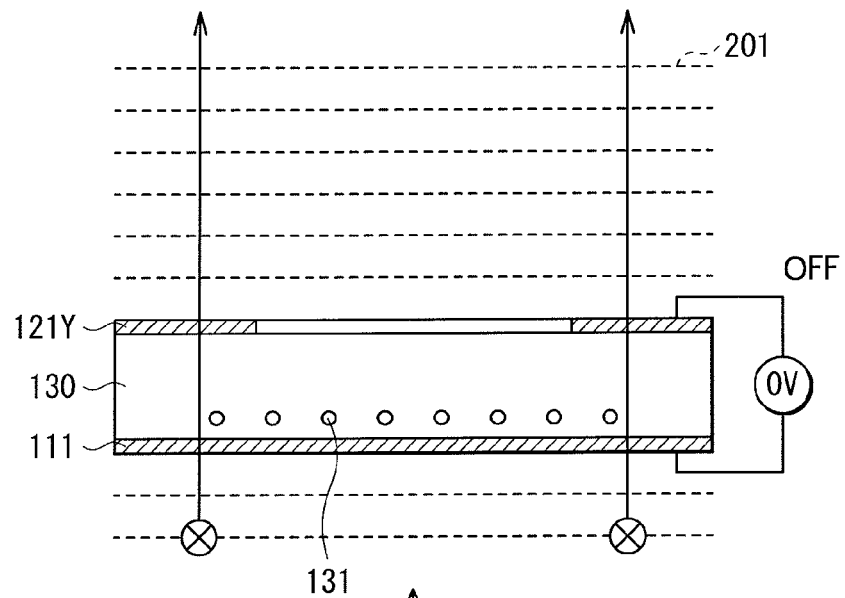
FIGS. 19A and 19B are section diagrams showing a basic configuration example of a variable lens array element in the past, where
Figure 19B:
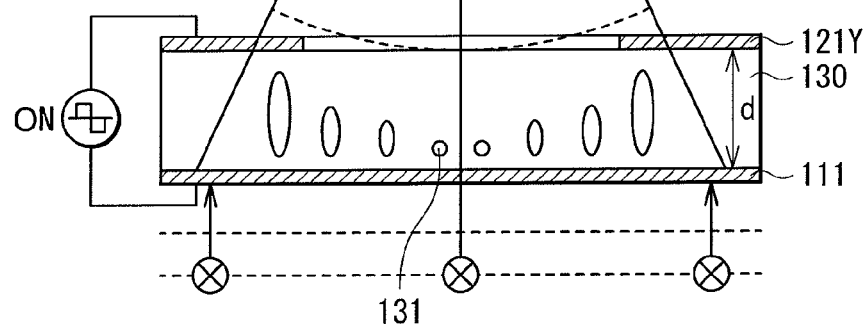

The display device uses the liquid crystal lens 1 to electrically perform on/off control of a lens effect and thus may selectively change a display mode between a full-screen two-dimensional (2D) display mode and a full-screen three-dimensional (3D) display mode. In the three-dimensional display mode, the liquid crystal lens 1 equivalently generates a lenticular-lens-like lens effect including cylindrical lenses 31Y arranged in parallel as shown in FIG. 5. In this case, each cylindrical lens 31Y is equivalently achieved by generating the linear Fresnel-lens-like lens effect as shown in FIG. 3. The principle of lenticular-type stereoscopic display is as described with FIG. 18.

The liquid crystal lens 1 controls the lens effect depending on the display mode so as to selectively change a passing state of a beam from the liquid crystal display module 2. The liquid crystal display module 2 performs video display based on two-dimensional image data in the case of two-dimensional display, and performs video display based on three-dimensional image data in the case of three-dimensional display. The three-dimensional image data are, for example, data including a plurality of parallax images corresponding to a plurality of view angle directions in three-dimensional display. For example, in the case of binocular three-dimensional display, the three-dimensional image data are data of parallax images for both right-eye display and left-eye display.

The embodiment is described with a lateral direction (horizontal direction) as an X direction and a longitudinal direction (vertical direction) as a Y direction in a plane parallel to each substrate surface of the liquid crystal lens 1 or each substrate surface of the liquid crystal display module 2. Basically, a lateral direction of the display surface of the liquid crystal display module 2 is the X direction, and a longitudinal direction thereof is the Y direction.

Configuration of Liquid Crystal Display Module 2 (Display Unit)

FIG. 4 shows a configuration example in the case that the liquid crystal display module 2 is configured of a transmissive liquid crystal display. In the configuration example, the display panel 2 is structured such that a liquid crystal section (liquid crystal display panel body) 40 is sandwiched by a backlight-side polarizing plate (first polarizing plate) 42 and a viewer-side polarizing plate (second polarizing plate) 43. The backlight-side polarizing plate 42 is disposed on a backlight 41 side, and the viewer-side polarizing plate 43 is disposed on a viewer side (light emission side). The liquid crystal display module 2 modulates light from the backlight 41 for each pixel according to image data and thus performs two-dimensional image display. The backlight-side polarizing plate 42 and the viewer-side polarizing plate 43 are disposed such that respective polarizing directions (transmission axes) are in crossed nicols. Consequently, the liquid crystal display module 2 emits display image light polarized in a particular polarizing direction. The polarizing direction is parallel to a transmission axis of the viewer-side polarizing plate 43.

The liquid crystal section 40 has a plurality of pixels, each pixel including, for example, an R (red) pixel, a G (green) pixel and a B (blue) pixel, and the pixels are arranged in a matrix. The pixels of the liquid crystal section 40 are disposed by N (an integer of 2 or more) for each pitch p of an equivalent cylindrical lens 31Y (linear Fresnel lens) formed by the liquid crystal lens 1. In the three-dimensional display mode, such a number N is presented as the number of beams (visual lines) for three-dimensional display.

Operation of Display Device

In the display device, voltage difference between the first electrodes 11Y and the second electrode 21 is made to be zero in the liquid crystal lens 1 and thus the lens effect is set to be off, so that display image light from the liquid crystal display module 2 is transmitted without being refracted, and therefore full-screen two-dimensional display is performed.

In addition, voltage is applied between the first electrodes 11Y and the second electrode 21 in the liquid crystal lens 1 and thus the lens effect is set to be on, so that display image light from the liquid crystal display module 2 is refracted so as to enable stereoscopy, and therefore full-screen three-dimensional display is performed.

Specific example of phase difference distribution in liquid crystal layer 3 and applied voltage thereto Next, description is made on a specific example of phase difference distribution in the liquid crystal layer 3 and applied voltage thereto in the case that the liquid crystal lens 1 generates the lens effect.

In the liquid crystal lens 1, phase difference distribution is formed with respect to an incident beam having a fundamental wavelength in the liquid crystal layer 3 with phase difference being changed from 0 to $2\pi\beta$ in a predetermined direction (X direction in the embodiment). Here, phase difference distribution with a maximum phase difference of $2\pi\beta$, $\beta$ being an integer of 2 or more, is formed, and a lens effect is generated so that focal lengths for a plurality of incident beams of different wavelengths including the fundamental wavelength are equal to one another.

Figure 6:
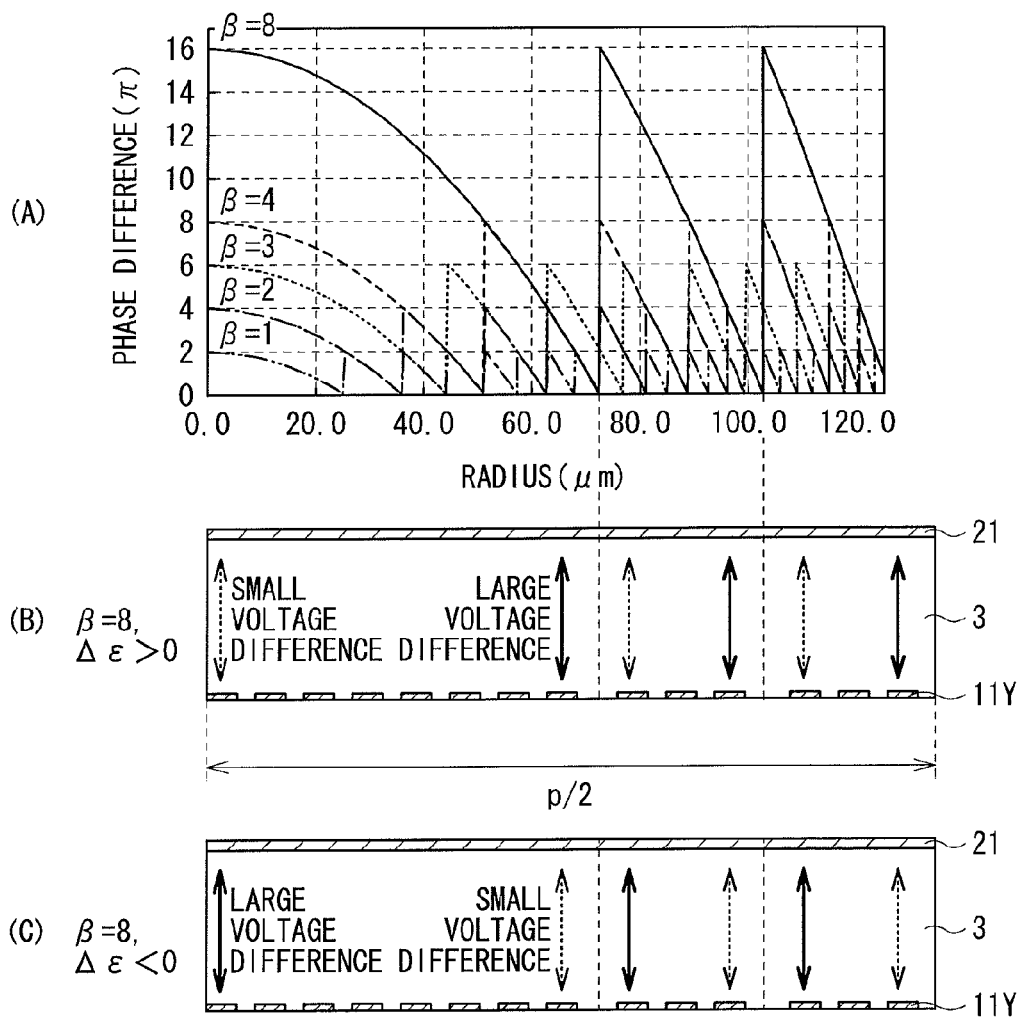
FIG. 6A is an explanatory diagram showing an example of phase difference distribution of an ideal Fresnel lens.
FIG. 6B is an explanatory diagram showing a state of applied voltage to a liquid crystal layer for forming phase difference distribution at β=8 shown in FIG. 6A in the case that dielectric anisotropy Δ∈ of liquid crystal molecules is positive in the liquid crystal lens shown in FIG. 1.
FIG. 6C is an explanatory diagram showing a state of applied voltage to the liquid crystal layer for forming phase difference distribution at β=8 shown in FIG. 6A in the case that dielectric anisotropy Δ∈ of the liquid crystal molecules is negative in the liquid crystal lens shown in FIG. 1.

For example, as shown in FIG. 6A, phase difference distribution is formed with respect to an incident beam having the fundamental wavelength with phase difference being periodically changed from 0 to $2\pi\beta$ along a predetermined direction, and thus, a Fresnel-lens-like lens effect is generated so that focal lengths for a plurality of incident beams of different wavelengths including the fundamental wavelength are equal to one another. FIG. 6A shows an example of phase difference distribution of an ideal Fresnel lens.

FIG. 6B shows a state of applied voltage to the liquid crystal layer 3 for forming phase difference distribution at $\beta=8$ shown in FIG. 6A in the case that dielectric anisotropy $\Delta\in$ of the liquid crystal molecules 5 is positive in the liquid crystal lens 1. As shown in the figure, in this case, voltage difference between the first electrodes 11Y and the second electrode 21 is increased in a state of minimal phase difference (0). The voltage difference is decreased in a state of maximum phase difference ($2\pi\beta$). The voltage difference is continuously varied so as to obtain desired phase difference distribution between a minimal phase difference position and a maximum phase difference position.

FIG. 6C shows a state of applied voltage to the liquid crystal layer 3 for forming phase difference distribution at $\beta=8$ shown in FIG. 6A in the case that dielectric anisotropy $\Delta\in$ of the liquid crystal molecules 5 is negative in the liquid crystal lens 1. As shown in the figure, in this case, voltage difference between the first electrodes 11Y and the second electrode 21 is decreased in the state of minimal phase difference (0). The voltage difference is increased in the state of maximum phase difference ($2\pi\beta$). The voltage difference is continuously varied so as to obtain desired phase difference distribution between the minimal phase difference position and the maximum phase difference position.

FIG. 6A shows phase difference distribution in a region where size of the lens in a radial direction corresponds to half the lens pitch p, p/2, of the cylindrical lens 31Y shown in FIG. 5. FIG. 6B or 6C shows a structure only in a region where size of the lens in the radial direction corresponds to half the lens pitch p, p/2, of the cylindrical lens 31Y shown in FIG. 5.

The phase difference distribution shown in FIG. 6A may be expressed by the following expression (1).

$$\phi_m = 2\pi\alpha\beta[m - r^2/(2\lambda_0 f_0 \beta)]$$

$$r_m < r < r_{m+1}$$

$$\alpha = \lambda_0[\Delta n(\lambda_1) - 1]/\{\lambda_1[\Delta n(\lambda_0) - 1]\}$$

$$\beta = \Delta n(\lambda_0) d/\lambda_0$$

$$m = 0, 1, 2, \ldots \quad (1)$$

$\phi_m$: phase difference
$\lambda_0$: fundamental wavelength
$\lambda_1$: measured wavelength
$\Delta n(\lambda_0)$: difference in refractive index of the liquid crystal molecule 5 at the fundamental wavelength $\lambda_0$ (difference between refractive indexes ne and no in two directions of the liquid crystal molecule 5, showing refractive anisotropy)
$\Delta n(\lambda_1)$: difference in refractive index of the liquid crystal molecule 5 at the measured wavelength $\lambda_1$
$f_0$: focal length at the fundamental wavelength $\lambda_0$
r: distance from a central position of the liquid crystal lens as a Fresnel lens to an arbitrary position in a predetermined direction (lens radius direction)
$r_m$: distance from a central position of the liquid crystal lens as a Fresnel lens to a position corresponding to the mth Fresnel zone
d: thickness of the liquid crystal layer 3

Figure 7A:
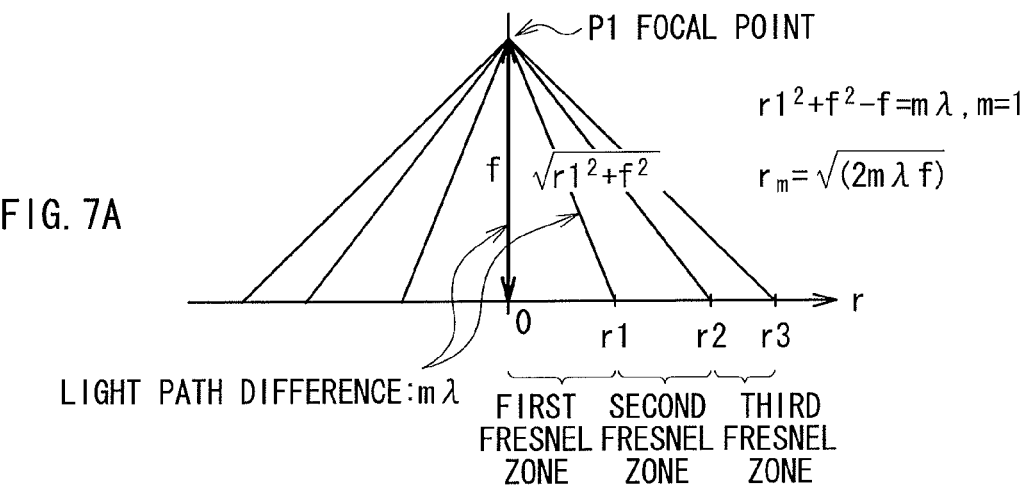
FIG. 7A is an explanatory diagram of optical path length from a position at a radial distance r to a focal point in a typical Fresnel lens.
Figure 7B:
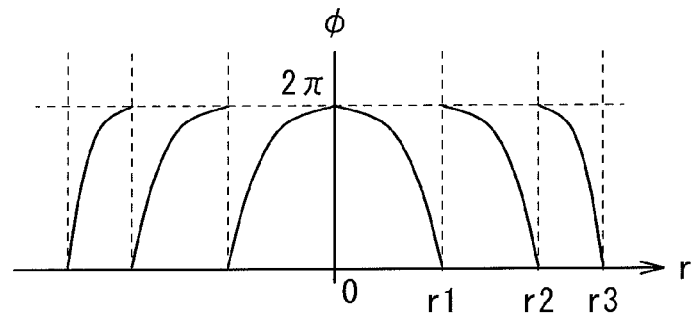
FIG. 7B is an explanatory diagram showing a relationship between the radial distance r and phase difference distribution in the typical Fresnel lens.

FIG. 7A comparatively shows optical path lengths from positions at respective radial distances r to a focal point P1 in a typical Fresnel lens. FIG. 7B shows a relationship between a radial distance r and phase difference distribution in the typical Fresnel lens. As shown in FIG. 7B, a typical Fresnel lens forms phase difference distribution with phase difference being changed from 0 to $2\pi$ with respect to a passing beam in each Fresnel zone (region between $r_m$ and $r_{m+1}$) shown in FIG. 7A. In the expression (1), r corresponds to a distance from the central position to an arbitrary position in each Fresnel zone.

When the fundamental wavelength is newly taken as $\lambda_1$ in the expression (1), the expression is corrected by correspondingly shifted phase difference with a phase difference factor $\gamma$, and thus may be expressed as the following expression (2).

$$\phi_m = 2\pi(\beta+\gamma)[m - r^2/\{2\lambda_1 f_1(\beta+\gamma)\}] \quad (2)$$

$f_1$: focal length at measured wavelength $\lambda_1$
From the expressions (1) and (2), a condition of $f_0 = f_1$ is expressed as follows.

$$\alpha = 1 + \gamma/\gamma \quad (3)$$

The liquid crystal lens 1 is configured such that thickness d of the liquid crystal layer 3 and refractive anisotropy of the liquid crystal molecule 5 satisfy the expressions (1) to (3). Accordingly, the focal length $f_0$ at the fundamental wavelength $\lambda_0$ and the focal length $f_1$ at another wavelength (measured wavelength $\lambda_1$) different from the fundamental wavelength $\lambda_0$ have the same values.

Tables 1 to 3 show a combination example of $\beta$ and $\gamma$ satisfying the expression (3). Table 4 shows calculated values of $\alpha$ for a typical liquid crystal material. The unit of wavelength $\lambda$ is nm. Since the values are calculated values, the values include negative wavelengths that may not actually exist. In Tables 1 to 3, each hatched portion indicates a wavelength out of a visible wavelength range.

TABLE 1

| β | γ | 1 + γ/β | λ |
|---|---|---|---|
| 1 | -1 | 0.00 | 2257 |
|   | 0 | 1.00 | 549 |
|   | 1 | 2.00 | -21 |
| 2 | -2 | 0.00 | 2257 |
|   | -1 | 0.50 | 1048 |
|   | 0 | 1.00 | 549 |
|   | 1 | 1.50 | 336 |
|   | 2 | 2.00 | -21 |
| 3 | -3 | 0.00 | 2257 |
|   | -2 | 0.33 | 1351 |
|   | -1 | 0.67 | 824 |
|   | 0 | 1.00 | 549 |
|   | 1 | 1.33 | 402 |
|   | 2 | 1.67 | 254 |
|   | 3 | 2.00 | -21 |
| 4 | -4 | 0.00 | 2257 |
|   | -3 | 0.25 | 1537 |
|   | -2 | 0.50 | 1048 |
|   | -1 | 0.75 | 736 |
|   | 0 | 1.00 | 549 |
|   | 1 | 1.25 | 434 |
|   | 2 | 1.50 | 336 |
|   | 3 | 1.75 | 202 |
|   | 4 | 2.00 | -21 |
| 5 | -5 | 0.00 | 2257 |
|   | -4 | 0.20 | 1661 |
|   | -3 | 0.40 | 1219 |
|   | -2 | 0.60 | 905 |
|   | -1 | 0.80 | 691 |
|   | 0 | 1.00 | 549 |
|   | 1 | 1.20 | 454 |
|   | 2 | 1.40 | 376 |
|   | 3 | 1.60 | 289 |
|   | 4 | 1.80 | 166 |
|   | 5 | 2.00 | -21 |
| 6 | -6 | 0.00 | 2257 |
|   | -5 | 0.17 | 1749 |
|   | -4 | 0.33 | 1351 |
|   | -3 | 0.50 | 1048 |
|   | -2 | 0.67 | 824 |
|   | -1 | 0.83 | 663 |
|   | 0 | 1.00 | 549 |
|   | 1 | 1.17 | 468 |
|   | 2 | 1.33 | 402 |
|   | 3 | 1.50 | 336 |
|   | 4 | 1.67 | 254 |
|   | 5 | 1.83 | 140 |
|   | 6 | 2.00 | -21 |
| 7 | -7 | 0.00 | 2257 |
|   | -6 | 0.14 | 1814 |
|   | -5 | 0.29 | 1454 |
|   | -4 | 0.43 | 1167 |
|   | -3 | 0.57 | 943 |
|   | -2 | 0.71 | 772 |
|   | -1 | 0.86 | 644 |
|   | 0 | 1.00 | 549 |
|   | 1 | 1.14 | 478 |
|   | 2 | 1.29 | 420 |
|   | 3 | 1.43 | 365 |
|   | 4 | 1.57 | 303 |
|   | 5 | 1.71 | 225 |
|   | 6 | 1.86 | 120 |
|   | 7 | 2.00 | -21 |

TABLE 1-continued

| β | γ | 1 + γ/β | λ |
|---|---|---------|---|
| 8 | -8 | 0.00 | 2257 |
|   | -7 | 0.13 | 1865 |
|   | -6 | 0.25 | 1537 |
|   | -5 | 0.38 | 1267 |
|   | -4 | 0.50 | 1048 |
|   | -3 | 0.63 | 873 |
|   | -2 | 0.75 | 736 |
|   | -1 | 0.88 | 631 |
|   | 0 | 1.00 | 549 |
|   | 1 | 1.13 | 486 |
|   | 2 | 1.25 | 434 |
|   | 3 | 1.38 | 386 |
|   | 4 | 1.50 | 336 |
|   | 5 | 1.63 | 277 |
|   | 6 | 1.75 | 202 |
|   | 7 | 1.88 | 105 |
|   | 8 | 2.00 | -21 |
| 9 | -9 | 0.00 | 2257 |
|   | -8 | 0.11 | 1905 |
|   | -7 | 0.22 | 1604 |
|   | -6 | 0.33 | 1351 |
|   | -5 | 0.44 | 1139 |
|   | -4 | 0.56 | 965 |
|   | -3 | 0.67 | 824 |
|   | -2 | 0.78 | 710 |
|   | -1 | 0.89 | 620 |
|   | 0 | 1.00 | 549 |
|   | 1 | 1.11 | 492 |
|   | 2 | 1.22 | 445 |
|   | 3 | 1.33 | 402 |
|   | 4 | 1.44 | 359 |
|   | 5 | 1.56 | 311 |
|   | 6 | 1.67 | 254 |
|   | 7 | 1.78 | 183 |
|   | 8 | 1.89 | 93 |
|   | 9 | 2.00 | -21 |

TABLE 2

| β | γ | 1 + γ/β | λ |
|---|---|---------|---|
| 10 | -10 | 0.00 | 2257 |
|    | -9 | 0.10 | 1938 |
|    | -8 | 0.20 | 1661 |
|    | -7 | 0.30 | 1422 |
|    | -6 | 0.40 | 1219 |
|    | -5 | 0.50 | 1048 |
|    | -4 | 0.60 | 905 |
|    | -3 | 0.70 | 787 |
|    | -2 | 0.80 | 691 |
|    | -1 | 0.90 | 613 |
|    | 0 | 1.00 | 549 |
|    | 1 | 1.10 | 498 |
|    | 2 | 1.20 | 454 |
|    | 3 | 1.30 | 414 |
|    | 4 | 1.40 | 376 |
|    | 5 | 1.50 | 336 |
|    | 6 | 1.60 | 289 |
|    | 7 | 1.70 | 234 |
|    | 8 | 1.80 | 166 |
|    | 9 | 1.90 | 82 |
|    | 10 | 2.00 | -21 |

TABLE 2-continued

| β | γ | 1 + γ/β | λ |
|---|---|---------|---|
| 11 | -11 | 0.00 | 2257 |
|    | -10 | 0.09 | 1965 |
|    | -9 | 0.18 | 1708 |
|    | -8 | 0.27 | 1483 |
|    | -7 | 0.36 | 1289 |
|    | -6 | 0.45 | 1122 |
|    | -5 | 0.55 | 979 |
|    | -4 | 0.64 | 859 |
|    | -3 | 0.73 | 759 |
|    | -2 | 0.82 | 675 |
|    | -1 | 0.91 | 606 |
|    | 0 | 1.00 | 549 |
|    | 1 | 1.09 | 502 |
|    | 2 | 1.18 | 461 |
|    | 3 | 1.27 | 425 |
|    | 4 | 1.36 | 390 |
|    | 5 | 1.45 | 355 |
|    | 6 | 1.55 | 316 |
|    | 7 | 1.64 | 271 |
|    | 8 | 1.73 | 217 |
|    | 9 | 1.82 | 152 |
|    | 10 | 1.91 | 74 |
|    | 11 | 2.00 | -21 |
| 12 | -12 | 0.00 | 2257 |
|    | -11 | 0.08 | 1988 |
|    | -10 | 0.17 | 1749 |
|    | -9 | 0.25 | 1537 |
|    | -8 | 0.33 | 1351 |
|    | -7 | 0.42 | 1188 |
|    | -6 | 0.50 | 1048 |
|    | -5 | 0.58 | 927 |
|    | -4 | 0.67 | 824 |
|    | -3 | 0.75 | 736 |
|    | -2 | 0.83 | 663 |
|    | -1 | 0.92 | 601 |
|    | 0 | 1.00 | 549 |
|    | 1 | 1.08 | 506 |
|    | 2 | 1.17 | 468 |
|    | 3 | 1.25 | 434 |
|    | 4 | 1.33 | 402 |
|    | 5 | 1.42 | 370 |
|    | 6 | 1.50 | 336 |
|    | 7 | 1.58 | 298 |
|    | 8 | 1.67 | 254 |
|    | 9 | 1.75 | 202 |
|    | 10 | 1.83 | 140 |
|    | 11 | 1.92 | 67 |
|    | 12 | 2.00 | -21 |
| 13 | -13 | 0.00 | 2257 |
|    | -12 | 0.08 | 2008 |
|    | -11 | 0.15 | 1784 |
|    | -10 | 0.23 | 1583 |
|    | -9 | 0.31 | 1405 |
|    | -8 | 0.38 | 1248 |
|    | -7 | 0.46 | 1110 |
|    | -6 | 0.54 | 989 |
|    | -5 | 0.62 | 885 |
|    | -4 | 0.69 | 795 |
|    | -3 | 0.77 | 718 |
|    | -2 | 0.85 | 653 |
|    | -1 | 0.92 | 597 |
|    | 0 | 1.00 | 549 |
|    | 1 | 1.08 | 509 |
|    | 2 | 1.15 | 473 |
|    | 3 | 1.23 | 441 |
|    | 4 | 1.31 | 411 |
|    | 5 | 1.38 | 382 |
|    | 6 | 1.46 | 352 |
|    | 7 | 1.54 | 319 |
|    | 8 | 1.62 | 282 |
|    | 9 | 1.69 | 239 |
|    | 10 | 1.77 | 189 |
|    | 11 | 1.85 | 130 |
|    | 12 | 1.92 | 60 |
|    | 13 | 2.00 | -21 |

TABLE 3

| β | γ | 1 + γ/β | λ |
|---|---|---------|---|
| 14 | -14 | 0.00 | 2257 |
|  | -13 | 0.07 | 2025 |
|  | -12 | 0.14 | 1814 |
|  | -11 | 0.21 | 1624 |
|  | -10 | 0.29 | 1454 |
|  | -9 | 0.36 | 1302 |
|  | -8 | 0.43 | 1167 |
|  | -7 | 0.50 | 1048 |
|  | -6 | 0.57 | 943 |
|  | -5 | 0.64 | 851 |
|  | -4 | 0.71 | 772 |
|  | -3 | 0.79 | 703 |
|  | -2 | 0.86 | 644 |
|  | -1 | 0.93 | 593 |
|  | 0 | 1.00 | 549 |
|  | 1 | 1.07 | 511 |
|  | 2 | 1.14 | 478 |
|  | 3 | 1.21 | 448 |
|  | 4 | 1.29 | 420 |
|  | 5 | 1.36 | 393 |
|  | 6 | 1.43 | 365 |
|  | 7 | 1.50 | 336 |
|  | 8 | 1.57 | 303 |
|  | 9 | 1.64 | 267 |
|  | 10 | 1.71 | 225 |
|  | 11 | 1.79 | 177 |
|  | 12 | 1.86 | 120 |
|  | 13 | 1.93 | 55 |
|  | 14 | 2.00 | -21 |
| 15 | -15 | 0.00 | 2257 |
|  | -14 | 0.07 | 2039 |
|  | -13 | 0.13 | 1841 |
|  | -12 | 0.20 | 1661 |
|  | -11 | 0.27 | 1497 |
|  | -10 | 0.33 | 1351 |
|  | -9 | 0.40 | 1219 |
|  | -8 | 0.47 | 1101 |
|  | -7 | 0.53 | 997 |
|  | -6 | 0.60 | 905 |
|  | -5 | 0.67 | 824 |
|  | -4 | 0.73 | 752 |
|  | -3 | 0.80 | 691 |
|  | -2 | 0.87 | 637 |
|  | -1 | 0.93 | 590 |
|  | 0 | 1.00 | 549 |
|  | 1 | 1.07 | 514 |
|  | 2 | 1.13 | 482 |
|  | 3 | 1.20 | 454 |
|  | 4 | 1.27 | 427 |
|  | 5 | 1.33 | 402 |
|  | 6 | 1.40 | 376 |
|  | 7 | 1.47 | 350 |
|  | 8 | 1.53 | 321 |
|  | 9 | 1.60 | 289 |
|  | 10 | 1.67 | 254 |
|  | 11 | 1.73 | 213 |
|  | 12 | 1.80 | 166 |
|  | 13 | 1.87 | 112 |
|  | 14 | 1.93 | 50 |
|  | 14 | 2.00 | -21 |

TABLE 4

| λ | α (Δn) |
|---|--------|
| 380 | 1.39 |
| 390 | 1.36 |
| 400 | 1.34 |
| 410 | 1.31 |
| 420 | 1.28 |
| 430 | 1.26 |
| 440 | 1.23 |
| 450 | 1.21 |
| 460 | 1.18 |
| 470 | 1.16 |
| 480 | 1.14 |
| 490 | 1.12 |
| 500 | 1.10 |
| 510 | 1.08 |
| 520 | 1.06 |
| 530 | 1.04 |
| 540 | 1.02 |
| 550 | 1.00 |
| 560 | 0.98 |
| 570 | 0.97 |
| 580 | 0.95 |
| 590 | 0.93 |
| 600 | 0.92 |
| 610 | 0.90 |
| 620 | 0.89 |
| 630 | 0.88 |
| 640 | 0.86 |
| 650 | 0.85 |
| 660 | 0.84 |
| 670 | 0.82 |
| 680 | 0.81 |
| 690 | 0.80 |
| 700 | 0.79 |
| 710 | 0.78 |
| 720 | 0.77 |
| 730 | 0.76 |
| 740 | 0.75 |
| 750 | 0.74 |
| 760 | 0.73 |
| 770 | 0.72 |
| 780 | 0.71 |

In Tables 1 to 3, focal lengths have the same values at wavelengths in respective combinations of β and γ. For example, in the case of β=3 in Table 1, a focal lengths have the same values at a wavelength (549 nm) at γ=0 and at a wavelength (402 nm) at γ=1 in a visible wavelength range. In the examples of Tables 1 to 3, when β is 3 or more, a plurality of wavelengths, at which focal lengths have the same values, exist in the visible wavelength range. However, even if β is 2, it is likely that a plurality of wavelengths, at which focal lengths have the same values, exist in the visible wavelength range depending on kinds of liquid crystal materials.

Figure 8:
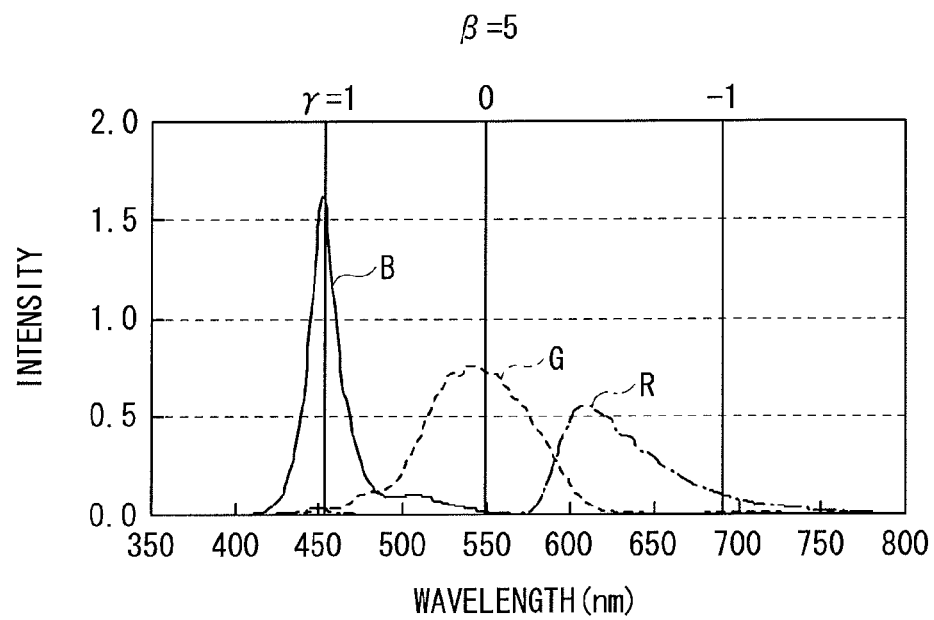
FIG. 8 is a characteristic diagram comparatively showing transmission spectrum distribution of a typical liquid crystal display using white LED and distribution of wavelengths with focal lengths equal to one another at a phase difference factor β of 5 in the liquid crystal lens shown in FIG. 1.
Figure 9:
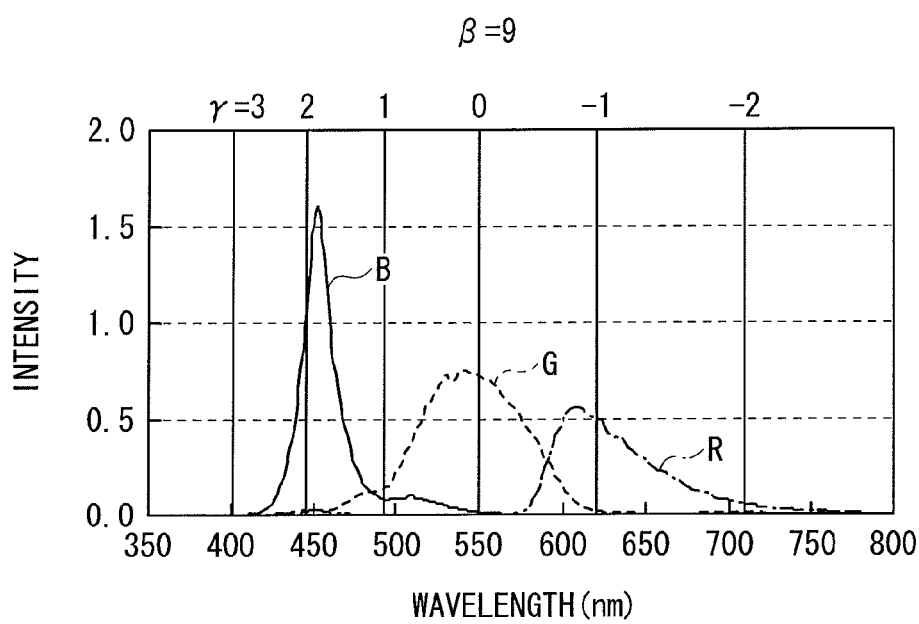
FIG. 9 is a characteristic diagram comparatively showing transmission spectrum distribution of a typical liquid crystal display using white LED and distribution of wavelengths with focal lengths equal to one another at a phase difference factor β of 9 in the liquid crystal lens shown in FIG. 1.
Figure 10:
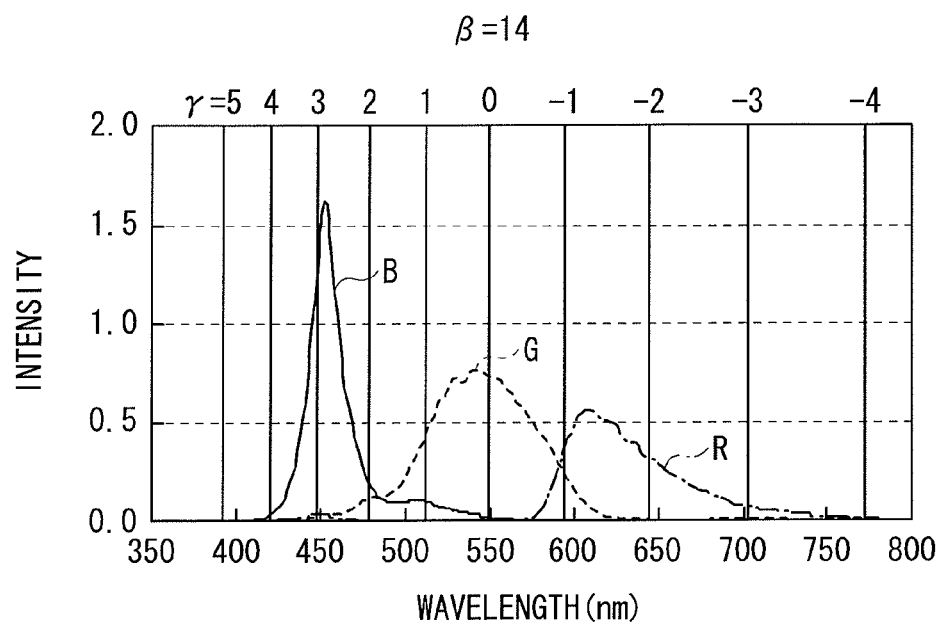
FIG. 10 is a characteristic diagram comparatively showing transmission spectrum distribution of a typical liquid crystal display using white LED and distribution of wavelengths with focal lengths equal to one another at a phase difference factor β of 14 in the liquid crystal lens shown in FIG. 1.
Figure 11:
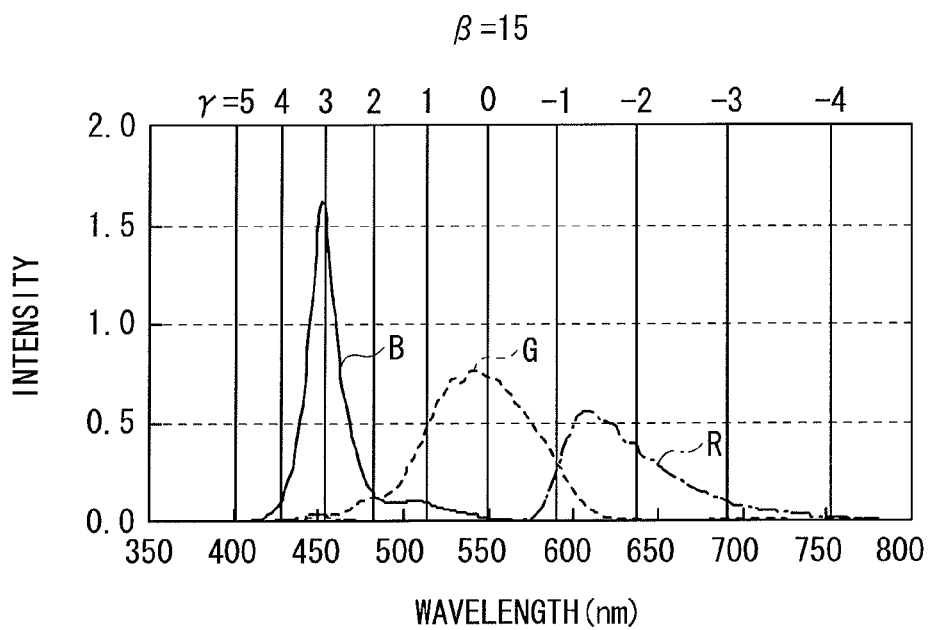
FIG. 11 is a characteristic diagram comparatively showing transmission spectrum distribution of a typical liquid crystal display using white LED and distribution of wavelengths with focal lengths equal to one another at a phase difference factor β of 15 in the liquid crystal lens shown in FIG. 1.

FIGS. 8 to 11 comparatively show distribution of wavelengths with focal lengths equal to one another as shown in Tables 1 to 3 and transmission spectrum distribution of a typical liquid crystal display using white LED. FIG. 8 shows a case of β=5, FIG. 9 shows a case of β=9, FIG. 10 shows a case of β=14, and FIG. 11 shows a case of β=15. FIGS. 8 to 11 and Tables 1 to 3 reveal that as a value of 13 becomes large, the number of wavelengths, at which color aberration does not occur (focal lengths are equal to one another), increases, and therefore efficiency is improved. In the case that the liquid crystal lens 1 is used for a liquid crystal display, as the wavelength distribution matches better with a transmission spectrum of a color filter and/or a spectrum of the backlight 41, higher lens performance of the liquid crystal lens 1 may be obtained. Specifically, an optimum backlight 41 at β=9 is a three-color LED backlight having peaks at λ of 445, 550 and 620 nm. Contrary to the above method, if a spectrum of the backlight 41 is known, a liquid crystal material, which may provide an α value in accordance with the spectrum, needs to be selected.

Figure 12:
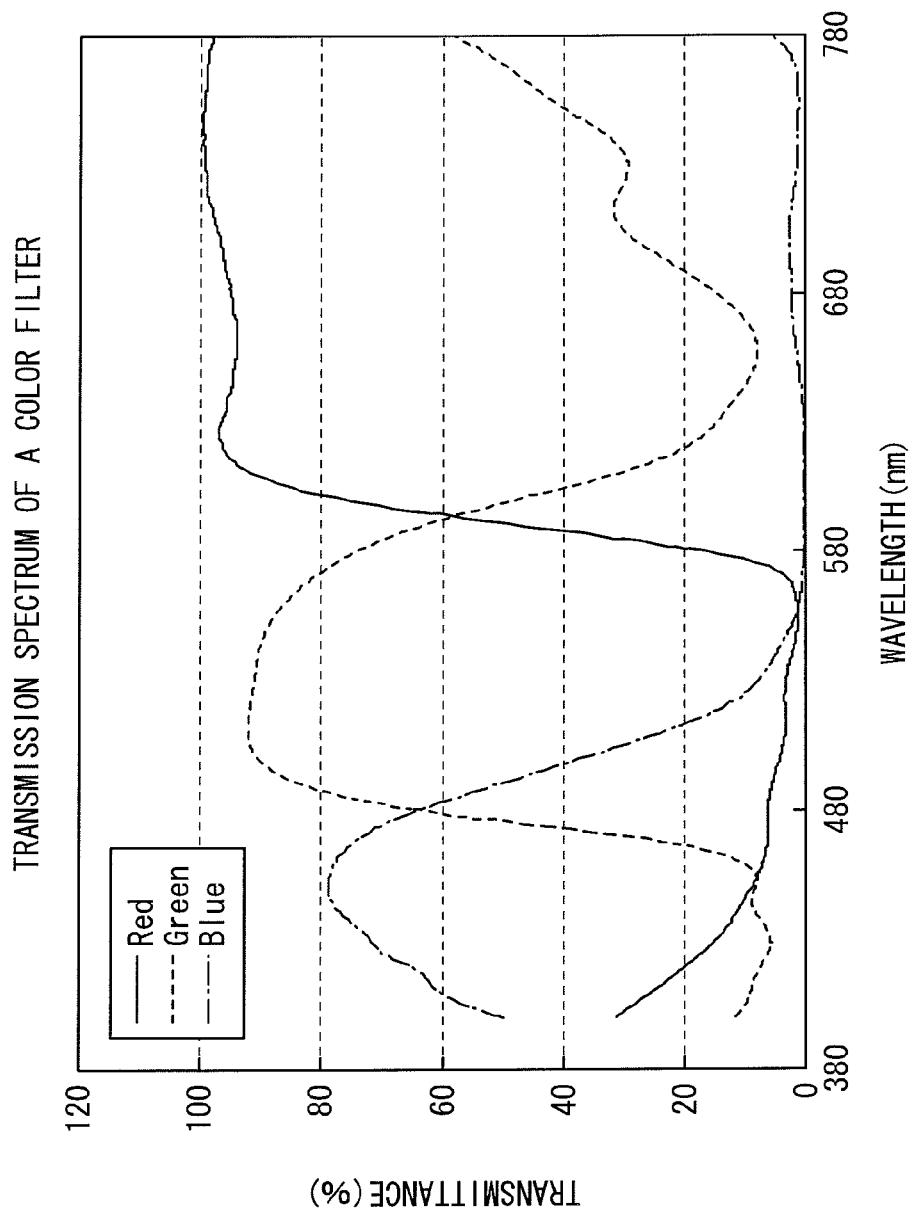
FIG. 12 is a characteristic diagram showing an example of transmission spectrum distribution of a color filter used for a liquid crystal display.

FIG. 12 shows an example of transmission spectrum distribution of a color filter used for a liquid crystal display. The liquid crystal lens 1 is preferably designed to generate a lens effect so that focal lengths for three or more wavelengths are equal to one another. On the assumption of the spectrum distribution of FIG. 12, particularly, each of the wavelengths with focal lengths equal to one another preferably includes wavelengths of $\lambda_R$, $\lambda_G$ and $\lambda_B$ belonging to respective wavelength ranges expressed by following expressions:

$$590 \text{ nm} \le \lambda_R \le 780 \text{ nm,}$$

$$475 \text{ nm} \le \lambda_G \le 600 \text{ nm, and}$$

$$400 \text{ nm} \le \lambda_B \le 490 \text{ nm.}$$

Figure 13:
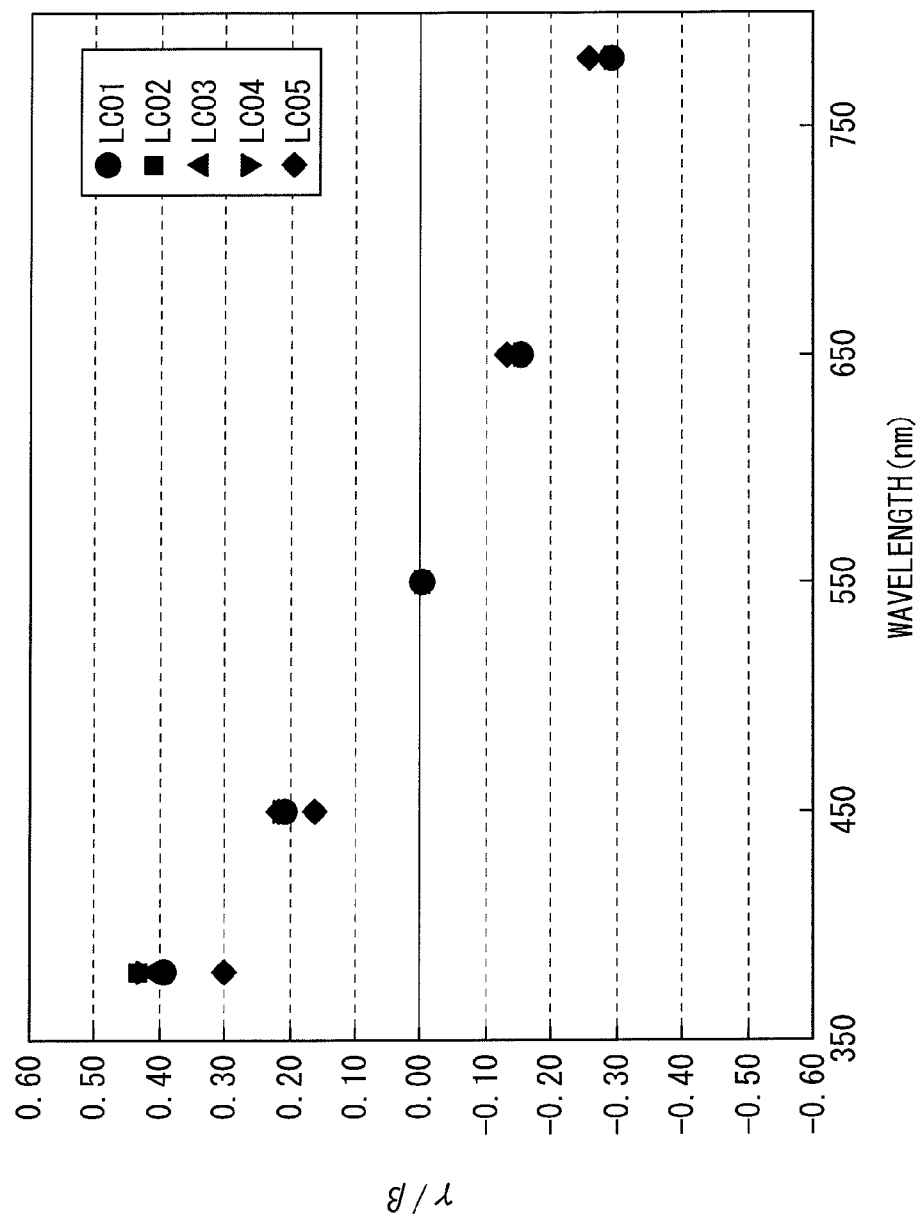
FIG. 13 is a characteristic diagram comparatively showing values of phase difference factors γ/β of a plurality of liquid crystal materials.

Table 5 shows characteristic values of a plurality of different liquid crystal materials. In Table 5, LC01 corresponds to a liquid crystal material shown in Table 4. In Table 5, ne and no indicate refractive indexes in two directions of a liquid crystal molecule, showing refractive anisotropy. FIG. 13 shows values of phase difference factors γ/β shown in Table 5 in a form of a graph. In this way, the values of phase difference factors γ/β vary depending on kinds of liquid crystal materials. Therefore, even in β=2, it is likely that a plurality of wavelengths with focal lengths having the same values exist in the visible wavelength range.

TABLE 5

| Liquid crystal | λ | ne | no | Δn | α(Δn) | γ/β |
|---|---|---|---|---|---|---|
| LC01 | 380 | 1.642 | 1.488 | 0.155 | 1.393 | 0.393 |
|  | 450 | 1.624 | 1.492 | 0.132 | 1.208 | 0.208 |
|  | 550 | 1.608 | 1.487 | 0.122 | 1.000 | 0.000 |
|  | 650 | 1.599 | 1.480 | 0.119 | 0.849 | −0.151 |
|  | 780 | 1.591 | 1.473 | 0.118 | 0.708 | −0.292 |
| LC02 | 380 | 1.578 | 1.492 | 0.086 | 1.434 | 0.434 |
|  | 450 | 1.565 | 1.484 | 0.081 | 1.217 | 0.217 |
|  | 550 | 1.554 | 1.477 | 0.077 | 1.000 | 0.000 |
|  | 650 | 1.548 | 1.473 | 0.075 | 0.848 | −0.152 |
|  | 780 | 1.543 | 1.470 | 0.073 | 0.708 | −0.292 |
| LC03 | 380 | 1.641 | 1.507 | 0.134 | 1.411 | 0.411 |
|  | 450 | 1.616 | 1.495 | 0.121 | 1.210 | 0.210 |
|  | 550 | 1.598 | 1.486 | 0.112 | 1.000 | 0.000 |
|  | 650 | 1.589 | 1.481 | 0.108 | 0.850 | −0.150 |
|  | 780 | 1.582 | 1.477 | 0.105 | 0.711 | −0.289 |
| LC04 | 380 | 1.607 | 1.500 | 0.107 | 1.425 | 0.425 |
|  | 450 | 1.591 | 1.492 | 0.099 | 1.214 | 0.214 |
|  | 550 | 1.577 | 1.484 | 0.093 | 1.000 | 0.000 |
|  | 650 | 1.568 | 1.478 | 0.090 | 0.849 | −0.151 |
|  | 780 | 1.560 | 1.472 | 0.089 | 0.708 | −0.292 |
| LC05 | 380 |  |  | 0.318 | 1.301 | 0.301 |
|  | 450 |  |  | 0.277 | 1.163 | 0.163 |
|  | 550 |  |  | 0.241 | 1.000 | 0.000 |
|  | 650 |  |  | 0.220 | 0.869 | −0.131 |
|  | 780 |  |  | 0.201 | 0.742 | −0.258 |

Relationship between polarization direction and alignment direction of liquid crystal molecules 5

When the liquid crystal lens 1 is used in combination with the liquid crystal display module 2 as shown in FIG. 4, beams emitted from the liquid crystal display module 2 are polarized in a particular polarization direction. In the liquid crystal lens 1, when voltage is not applied to the liquid crystal molecules 5, an in-plane alignment direction of the liquid crystal molecules 5 is preferably parallel to the particular polarization direction determined by a configuration of the liquid crystal display module 2. This may cause an efficient lens effect on the beams emitted from the liquid crystal display module 2. An alignment direction of the liquid crystal molecules 5 may be adjusted by a rubbing direction of a not-shown alignment film.

Figure 14:
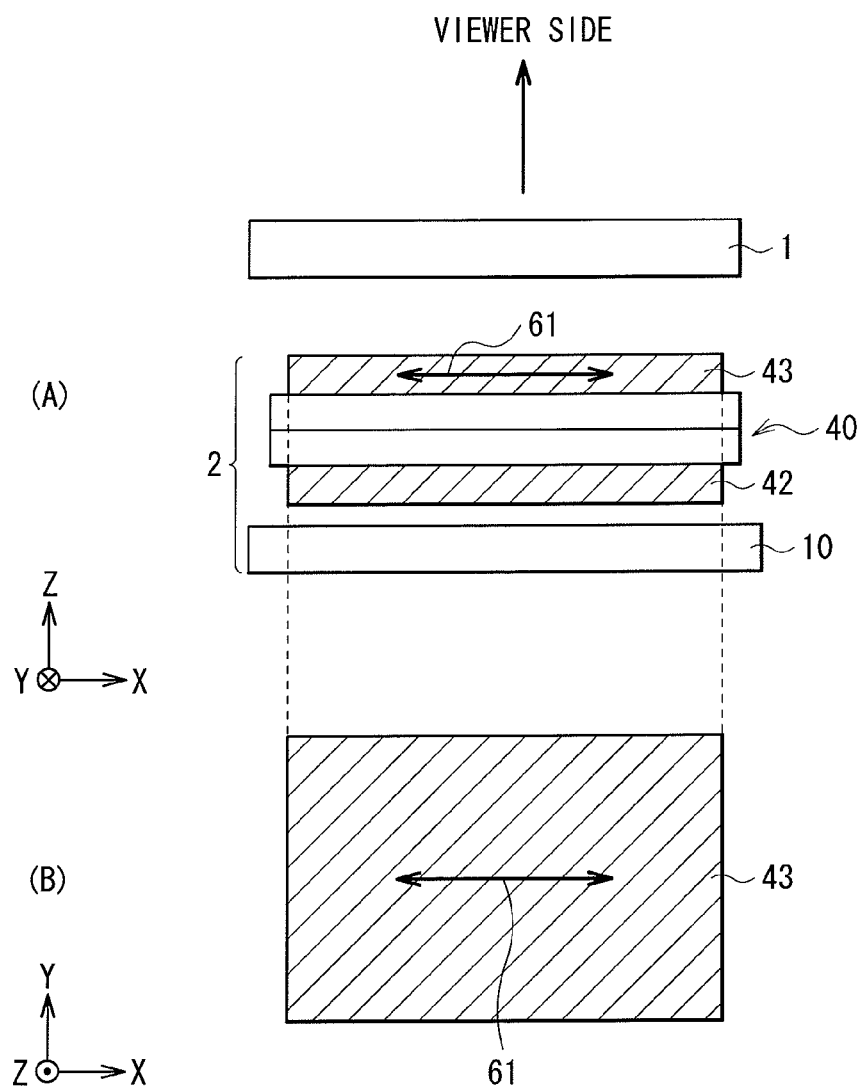
FIG. 14A is a section diagram showing a first example of a direction (polarization direction on a light emission side) of a transmission axis of a viewer-side polarizing plate of the liquid crystal display module shown in FIG. 4.
FIG. 14B is a plan diagram showing the first example of the direction of the transmission axis of the viewer-side polarizing plate.

FIGS. 14A and 14B show a first example of a direction (polarization direction on a light emission side) 61 of a transmission axis of the viewer-side polarizing plate 43 of the liquid crystal display module 2 shown in FIG. 4. In the first example, the polarization direction 61 on a light emission side is the X direction.

Figure 15:
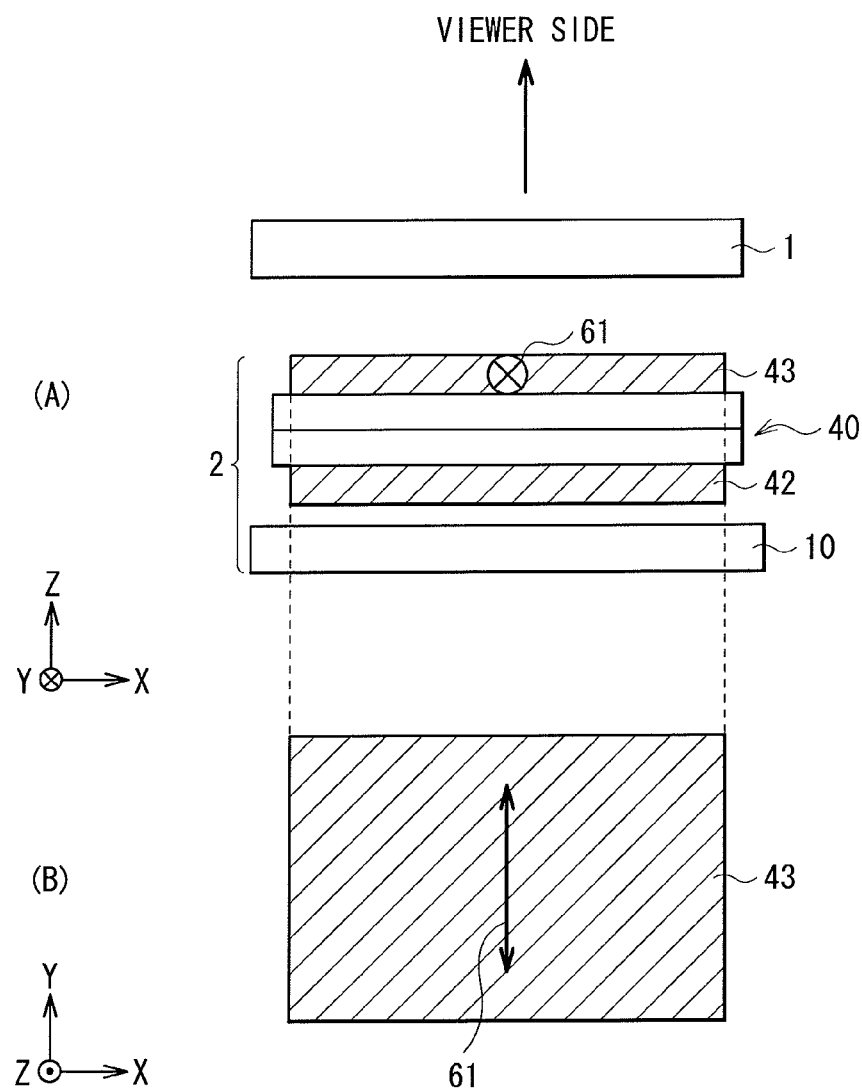
FIG. 15A is a section diagram showing a second example of the direction (polarization direction on a light emission side) of the transmission axis of the viewer-side polarizing plate of the liquid crystal display module shown in FIG. 4.
FIG. 15B is a plan diagram showing the second example of the direction of the transmission axis of the viewer-side polarizing plate.

FIGS. 15A and 15B show a second example of the direction (polarization direction on a light emission side) 61 of the transmission axis of the viewer-side polarizing plate 43 of the liquid crystal display module 2. In the second example, the polarization direction 61 on a light emission side is the Y direction.

Figure 16:
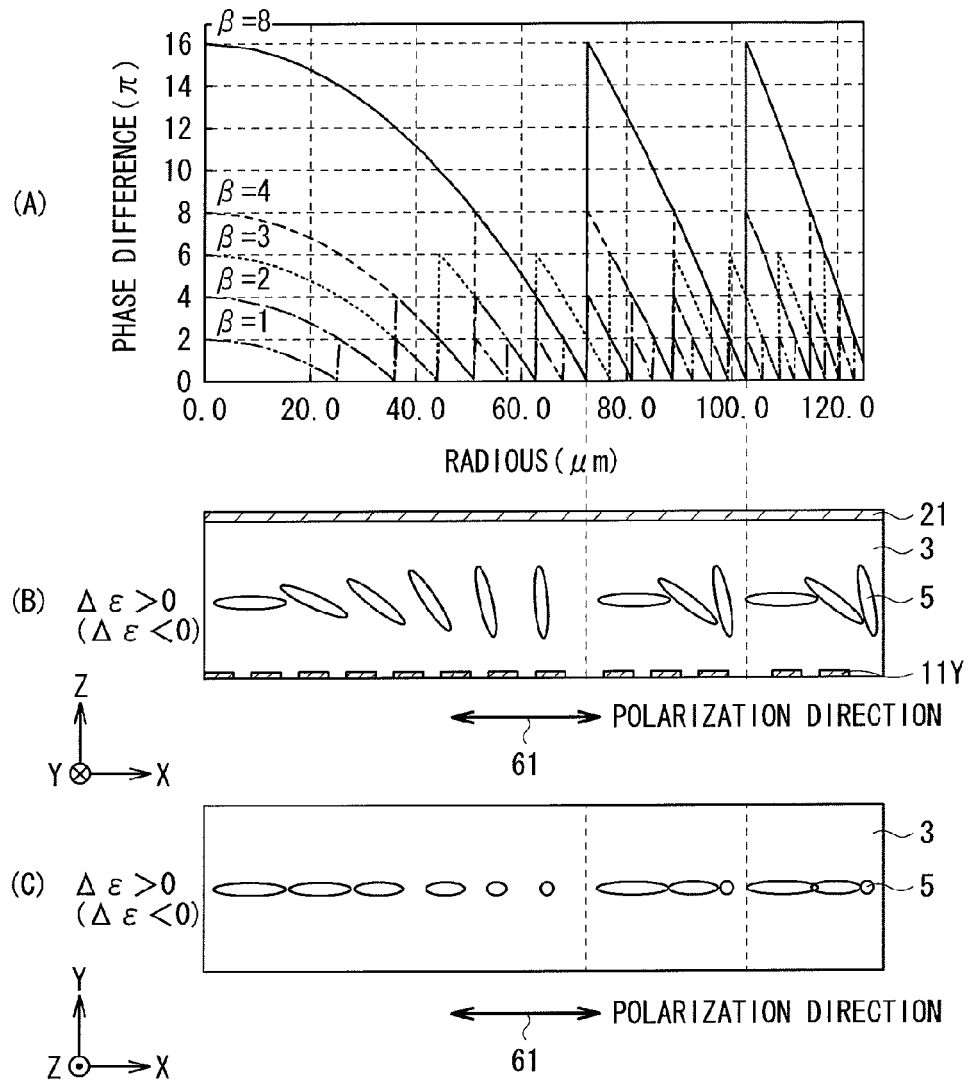
FIG. 16A is an explanatory diagram showing an example of phase difference distribution of an ideal Fresnel lens.
FIG. 16B is a section diagram showing an alignment state of liquid crystal molecules suitable for a case that a polarization direction on a light emission side is the direction as shown in FIGS. 14A and 14B.
FIG. 16C is a plan diagram showing the alignment state of the liquid crystal molecules shown in FIG. 16B as viewed from an upper side (viewer side).

FIG. 16A shows an example of phase difference distribution of an ideal Fresnel lens (the same figure as FIG. 6A). FIG. 16B shows an alignment state of the liquid crystal molecules 5 suitable for a case that the polarization direction 61 on a light emission side is the X direction as shown in FIGS. 14A and 14B. FIG. 16C shows the alignment state of the liquid crystal molecules 5 shown in FIG. 16B as viewed from an upper side (viewer side). FIGS. 16B and 16C show an example of a case where the lens generates a lens effect forming phase difference distribution at β=8 in FIG. 16A. While FIGS. 16B and 16C show the alignment state of the liquid crystal molecules 5 in the case that dielectric anisotropy Δ∈ is positive, a similar alignment state is given even in the case that dielectric anisotropy Δ∈ is negative.

Figure 17:
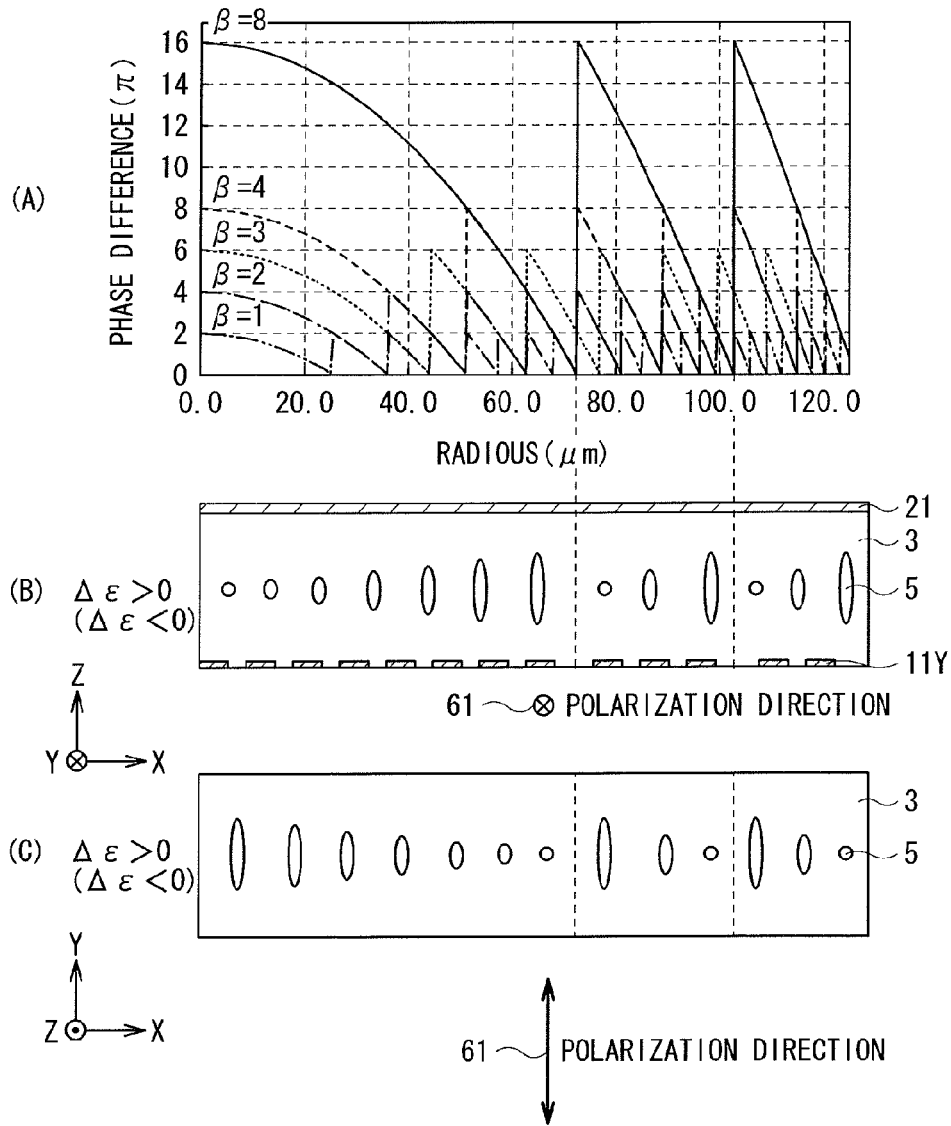
FIG. 17A is an explanatory diagram showing an example of phase difference distribution of an ideal Fresnel lens.
FIG. 17B is a section diagram showing an alignment state of liquid crystal molecules suitable for a case that a polarization direction on a light emission side is the direction as shown in FIGS. 15A and 15B.
FIG. 17C is a plan diagram showing the alignment state of the liquid crystal molecules shown in FIG. 17B as viewed from an upper side (viewer side).

FIG. 17A shows an example of phase difference distribution of an ideal Fresnel lens (the same figure as FIG. 6A). FIG. 17B shows an alignment state of the liquid crystal molecules 5 suitable for a case that the polarization direction 61 on a light emission side is the Y direction as shown in FIGS. 15A and 15B. FIG. 17C shows the alignment state of the liquid crystal molecules 5 shown in FIG. 17B as viewed from an upper side (viewer side). FIGS. 17B and 17C show an example of a case where the lens generates a lens effect forming phase difference distribution at β=8 in FIG. 17A. While FIGS. 17B and 17C show the alignment state of the liquid crystal molecules 5 in the case that dielectric anisotropy Δ∈ is positive, a similar alignment state is given even in the case that dielectric anisotropy Δ∈ is negative.

Disclinations hardly occur during voltage application and therefore good alignment is achieved in the configuration shown in FIGS. 17B and 17C compared with in the configuration shown in FIGS. 16B and 16C. Therefore, lens performance may be further improved in the configuration shown in FIGS. 17B and 17C.

As described hereinbefore, according to the liquid crystal lens 1 of the embodiment, phase difference distribution is formed with phase difference being changed from 0 to 2πβ, and a lens effect is generated so that focal lengths for a plurality of incident beams of different wavelengths including the fundamental wavelength are equal to one another, and therefore color aberration may be reduced compared with a previous liquid crystal lens providing phase difference distribution of 0 to 2π. According to the display device of the embodiment, since the liquid crystal lens 1 reduced in color aberration is used, good stereoscopic display with color aberration being reduced may be performed.

While wavelength dispersion caused by a diffraction phenomenon is negative, wavelength dispersion of a liquid crystal molecule itself having refractive anisotropy is positive. According to the liquid crystal lens 1 of the embodiment, since a maximum value of phase difference is large, 2πβ, compared with the previous liquid crystal lens providing phase difference distribution of 0 to 2π, thickness of the liquid crystal layer 3 is increased. However, when thickness of the liquid crystal layer 3 is increased, the negative wavelength dispersion caused by a diffraction phenomenon and the positive wavelength dispersion of a liquid crystal molecule itself may be canceled by each other at a plurality of wavelengths. Consequently, color aberration is advantageously reduced.

A self-luminous display such as an organic EL (Electro-Luminescence) display or a field emission display (FED) may be used as a display unit in place of the liquid crystal display module 2.

Moreover, the liquid crystal lens 1 may be structured to generate a lens effect like a Fresnel lens having a concentric Fresnel pattern. In this case, first electrodes 11Y are formed in a ring-zone shape, and voltage distribution is thus changed in a radial direction, thereby phase difference distribution may be changed in the radial direction.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal lens comprising:
   a first electrode;
   a second electrode disposed opposite to the first electrode; and
   a liquid crystal layer, including liquid crystal molecules having refractive anisotropy, disposed between the first electrode and the second electrode, the liquid crystal molecules being changed in alignment depending on voltage applied by the first electrode and the second electrode, thereby to form such a phase difference distribution that phase difference with respect to an incident beam of a fundamental wavelength varies from 0 to $2\pi\beta$ along the predetermined direction, $\beta$ being an integer of 2 or more, and to yield such a lens effect that focal lengths for a plurality of incident beams of different wavelengths including the fundamental wavelength are equal to one another,
   wherein magnitude of voltage difference between the first electrode and the second electrode is varied in correspondence to the phase difference distribution along the predetermined direction.

2. The liquid crystal lens according to claim 1, wherein the lens effect by the liquid crystal layer corresponds to a lens effect yielded by a Fresnel-lens.

3. A liquid crystal lens comprising:
   a first electrode;
   a second electrode disposed opposite to the first electrode; and
   a liquid crystal layer, including liquid crystal molecules having refractive anisotropy, disposed between the first electrode and the second electrode, the liquid crystal molecules being changed in alignment depending on voltage applied by the first electrode and the second electrode, thereby to form such a phase difference distribution that phase difference with respect to an incident beam of a fundamental wavelength varies from Q to $2\pi\beta$ along the predetermined direction, $\beta$ being an integer of 2 or more, and to yield such a lens effect that focal lengths for a plurality of incident beams of different wavelengths including the fundamental wavelength are equal to one another,
   wherein the lens effect by the liquid crystal layer corresponds to a lens effect yielded by a Fresnel-lens, wherein
   a thickness d of the liquid crystal layer and refractive anisotropy of the liquid crystal molecules designed to satisfy the following expressions (1) to (3), and a focal length $f_0$ at a fundamental wavelength $\lambda_0$ and a focal length $f_1$ at another wavelength (measured wavelength $\lambda_1$) different from the fundamental wavelength $\lambda_0$ are equal to each other, $$\phi_m = 2\pi\alpha\beta[m - r^2/(2\lambda_0 f_0 \beta)] \quad (1),$$

$$\phi_m = 2\pi(\beta+\gamma)[m - r^2/\{2\lambda_1 f_1(\beta+\gamma)\}] \quad (2)$$

and $$\alpha = 1 + \gamma/\beta$$

wherein $$r_m < r < r_{m+1}$$

$$\alpha = \lambda_0[\Delta n(\lambda_1) - 1]/\{\lambda_1[\Delta n(\lambda_0) - 1]\}$$

$$\beta = \Delta n(\lambda_0) d/\lambda_0$$

$$m = 0, 1, 2, \ldots,$$

where
r: distance from a central position of the liquid crystal lens as a Fresnel lens to an arbitrary position in the predetermined direction,
$r_m$: distance from a central position of the liquid crystal lens as a Fresnel lens to a position corresponding to the mth Fresnel zone,
$\lambda_0$: fundamental wavelength,
$\lambda_1$: measured wavelength,
$\Delta n(\lambda_0)$: difference in refractive index of the liquid crystal molecule at the fundamental wavelength $\lambda_0$ (difference between refractive indexes in two directions of the liquid crystal molecule, showing refractive anisotropy),
$\Delta n(\lambda_1)$: difference in refractive index of the liquid crystal molecule at the measured wavelength $\lambda_1$,
$f_0$: focal length at the fundamental wavelength $\lambda_0$,
$f_1$: focal length at the measured wavelength $\lambda_1$,
d: thickness of the liquid crystal layer, and
$\gamma$: phase difference factor.

4. The liquid crystal lens according to claim 1, wherein
the incident beam is polarized in a particular polarization direction, and
an in-plane alignment direction of the liquid crystal molecules under no application of voltage is parallel to the particular polarization direction.

5. The liquid crystal lens according to claim 1, wherein the lens effect is such that focal lengths for a plurality of incident beams of different wavelengths within a visible wavelength range are equal to one another.

6. The liquid crystal lens according to claim 1, wherein the lens effect is such that focal lengths for incident beams of three or more wavelengths are equal to one another, the three or more wavelengths including wavelengths of $\lambda_R$, $\lambda_G$ and $\lambda_B$ belonging to respective wavelength ranges expressed by following expressions:

$$590 \text{ nm} \leq \lambda_R \leq 780 \text{ nm},$$

$$475 \text{ nm} \leq \lambda_G \leq 600 \text{ nm, and}$$

$$400 \text{ nm} \leq \lambda_B \leq 490 \text{ nm}.$$

7. A display device having a display unit for performing two-dimensional image display and a liquid crystal lens disposed opposite the display unit so that display image light from the display unit enters the liquid crystal lens, the liquid crystal lens comprising:

a first electrode, a second electrode disposed opposite to the first electrode, and a liquid crystal layer, including liquid crystal molecules having refractive anisotropy, disposed between the first electrode and the second electrode, the liquid crystal molecules being changed in alignment depending on voltage applied by the first electrode and the second electrode, thereby to form such a phase difference distribution that phase difference with respect to an incident beam of a fundamental wavelength varies from 0 to $2\pi\beta$ along the predetermined direction, $\beta$ being an integer of 2 or more, and to yield such a lens effect that focal lengths for a plurality of incident beams of different wavelengths including the fundamental wavelength are equal to one another, wherein magnitude of voltage difference between the first electrode and the second electrode is varied in correspondence to the phase difference distribution along the predetermined direction.

8. The display device according to claim 7, wherein the lens effect of the liquid crystal lens is inactive under a condition that voltage difference between the first electrode and the second electrode is zero, and two-dimensional display is performed through setting the lens effect of the liquid crystal lens to inactive state so that display image light from the display unit is transmitted without being refracted, whereas three-dimensional display is performed through setting the lens effect of the liquid crystal lens to active state so that the display image light from the display unit is refracted so as to enable stereoscopy.

9. The display device according to claim 7, wherein display image light emitted from the display unit is polarized in a particular polarization direction to enter the liquid crystal lens as the incident beam, and an in-plane alignment direction of the liquid crystal molecules under no application of voltage is parallel to the particular polarization direction.

10. The display device according to claim 7, wherein the display image light from the display unit contains three wavelength components of $\lambda_R$, $\lambda_G$ and $\lambda_B$ belonging to respective wavelength ranges expressed by following expressions, and the lens effect is such that focal lengths for incident beams of three or more wavelengths are equal to one another, the three or more wavelengths including wavelengths of $\lambda_R$, $\lambda_G$ and $\lambda_B$ belonging to respective wavelength ranges expressed by following expressions:

$590 \text{ nm} \leq \lambda_R \leq 780 \text{ nm},$ $475 \text{ nm} \leq \lambda_G \leq 600 \text{ nm, and}$ $400 \text{ nm} \leq \lambda_B \leq 490 \text{ nm}.$

* * * * *